(12) United States Patent
Hsu et al.

(10) Patent No.: US 11,567,594 B2
(45) Date of Patent: Jan. 31, 2023

(54) TOUCH SCREEN PROTECTIVE FILM STRUCTURE WITH PENETRATING-TRANSMITTING SIGNAL FUNCTION

(71) Applicant: Wen-Chi Hsu, New Taipei (TW)

(72) Inventors: Wen-Chi Hsu, New Taipei (TW); Bo-Yuan Hsu, New Taipei (TW); Chao-Yen Wei, New Taipei (TW)

(73) Assignee: Wen-Chi Hsu, New Taipei (TW)

( * ) Notice: Subject to any disclaimer, the term of this patent is extended or adjusted under 35 U.S.C. 154(b) by 0 days.

(21) Appl. No.: 17/205,781

(22) Filed: Mar. 18, 2021

(65) Prior Publication Data
US 2022/0300100 A1 Sep. 22, 2022

(51) Int. Cl.
*G06F 3/041* (2006.01)
*G06F 3/0488* (2022.01)

(52) U.S. Cl.
CPC .......... *G06F 3/0412* (2013.01); *G06F 3/0488* (2013.01); *G06F 2203/04103* (2013.01); *G06F 2203/04107* (2013.01)

(58) Field of Classification Search
CPC .................. G06F 3/0412; G06F 3/0488; G06F 2203/04103; G06F 2203/04107
See application file for complete search history.

(56) References Cited

U.S. PATENT DOCUMENTS

2017/0274635 A1* 9/2017 Lin ................... B29C 63/0056
2019/0204959 A1* 7/2019 Ko ...................... G02F 1/13338

FOREIGN PATENT DOCUMENTS

KR          20170085408 A * 7/2017

* cited by examiner

*Primary Examiner* — Sahlu Okebato
(74) *Attorney, Agent, or Firm* — Chun-Ming Shih; HDLS IPR Services

(57) ABSTRACT

A touch screen protective film structure with a penetrating-transmitting signal function includes a touch screen protective film and at least one signal transmission path. The at least one signal transmission path is embedded in the touch screen protective film partially or completely. The at least one signal transmission path includes a first end and a second end. The second end faces a specific touch area of a touch screen of an electronic apparatus. The first end receives a touch signal and transmits the touch signal to the second end. The specific touch area senses the touch signal to operate the electronic apparatus based on the touch signal. The second end defines at least one gap. The specific touch area penetrates the at least one gap defined by the second end to be touched for operating the electronic apparatus.

7 Claims, 4 Drawing Sheets

TOUCH SCREEN PROTECTIVE FILM STRUCTURE WITH PENETRATING-TRANSMITTING SIGNAL FUNCTION

BACKGROUND

Technical Field

The present disclosure relates to a touch screen protective film structure, and especially relates to a touch screen protective film structure with a penetrating-transmitting signal function.

Description of Related Art

Modern people use smart phones almost every day, so smart phones have become indispensable electronic apparatuses. The smart phone is equipped with a touch screen, allowing the user to operate the smart phone (for example, to execute games or applications) through the touch screen. After the touch screen is used for a long time, scratches are easy to occur. In order to avoid scratches on the touch screen, the touch screen protective film will be attached to the touch screen to protect the touch screen.

The location of a specific touch area (used to execute games or applications) on the touch screen is sometimes not designed properly, so that the gestures used by the user to operate the smart phone through the touch screen are sometimes not user-friendly. Therefore, a related art touch screen protective film structure is provided. The related art touch screen protective film structure includes a related art touch screen protective film, a related art signal transmission path and a related art pressing mechanism. The related art touch screen protective film is attached to the touch screen to protect the touch screen. The related art pressing mechanism is arranged on one side of the smart phone. The related art signal transmission path includes a first end and a second end. The first end is connected to the related art pressing mechanism. The second end is embedded in the related art touch screen protective film and faces the specific touch area of the touch screen. When the user presses the related art pressing mechanism arranged on one side of the smart phone, an electrostatic signal is generated and transmitted to the second end of the related art signal transmission path through the first end of the related art signal transmission path. Since the second end of the related art signal transmission path faces the specific touch area of the touch screen, an analog touch is generated on the specific touch area, just like the user touching the specific touch area, to execute a game or an application.

However, since the area of the second end of the related art signal transmission path completely covers the specific touch area, the general touch function of the specific touch area will be covered and affected by the second end. For example, when the above-mentioned game or application is not executed, if the user wants to directly touch the specific touch area to operate the smart phone, the specific touch area will be less sensitive, so that the smart phone is not operated easily through the specific touch area.

SUMMARY OF THE DISCLOSURE

In order to solve the above-mentioned problems, an object of the present disclosure is to provide a touch screen protective film structure with a penetrating-transmitting signal function.

In order to achieve the object of the present disclosure mentioned above, the touch screen protective film structure of the present disclosure is applied to an electronic apparatus. The electronic apparatus includes a touch screen. The touch screen protective film structure includes a touch screen protective film and at least one signal transmission path. The touch screen protective film is attached to the touch screen. The at least one signal transmission path is embedded in the touch screen protective film partially or completely. Moreover, the at least one signal transmission path includes a first end and a second end. The first end is embedded in the touch screen protective film partially or completely. The second end is embedded in the touch screen protective film. The second end is configured to face a specific touch area of the touch screen. Moreover, the first end is configured to receive a touch signal and transmit the touch signal to the second end. The specific touch area is configured to sense the touch signal to operate the electronic apparatus based on the touch signal. Moreover, the second end is configured to define at least one gap. If the second end is touched, the specific touch area is configured to penetrate the at least one gap defined by the second end to be touched for operating the electronic apparatus.

Moreover, in an embodiment of the touch screen protective film structure of the present disclosure mentioned above, the second end includes a plurality of signal transmission branches. The at least one gap is defined between the signal transmission branches.

Moreover, in an embodiment of the touch screen protective film structure of the present disclosure mentioned above, a first width of the at least one gap is between 0.5 millimeter to 15 millimeters. A second width of each of the signal transmission branches is between 0.1 millimeter to 4 millimeters.

Moreover, in an embodiment of the touch screen protective film structure of the present disclosure mentioned above, each of the signal transmission branches is waved, straight or rounded. The at least one gap is waved, straight or rounded correspondingly.

Moreover, in an embodiment of the touch screen protective film structure of the present disclosure mentioned above, the touch screen protective film includes a touch screen protective layer and an adhesive layer. The adhesive layer is attached to the touch screen. The at least one signal transmission path is embedded between the touch screen protective layer and the adhesive layer partially or completely.

Moreover, in an embodiment of the touch screen protective film structure of the present disclosure mentioned above, the touch screen protective layer is made of a toughened glass, a polyethylene terephthalate film or a thermoplastic polyurethane film.

Moreover, in an embodiment of the touch screen protective film structure of the present disclosure mentioned above, the touch screen protective film structure further includes a pressing mechanism. The pressing mechanism is connected to the first end. The pressing mechanism is arranged on one side of the electronic apparatus. Moreover, the pressing mechanism is configured to be pressed to generate the touch signal and transmit the touch signal to the first end.

Moreover, in an embodiment of the touch screen protective film structure of the present disclosure mentioned above, the touch signal is an electrostatic signal.

Moreover, in an embodiment of the touch screen protective film structure of the present disclosure mentioned above, the second end and the at least one gap are configured to form a hollow circular together.

The advantage of the present disclosure is to provide a humanized touch method for the touch screen to operate the electronic apparatus (for example, to execute games or applications) without affecting the general touch function of the specific touch area mentioned above.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
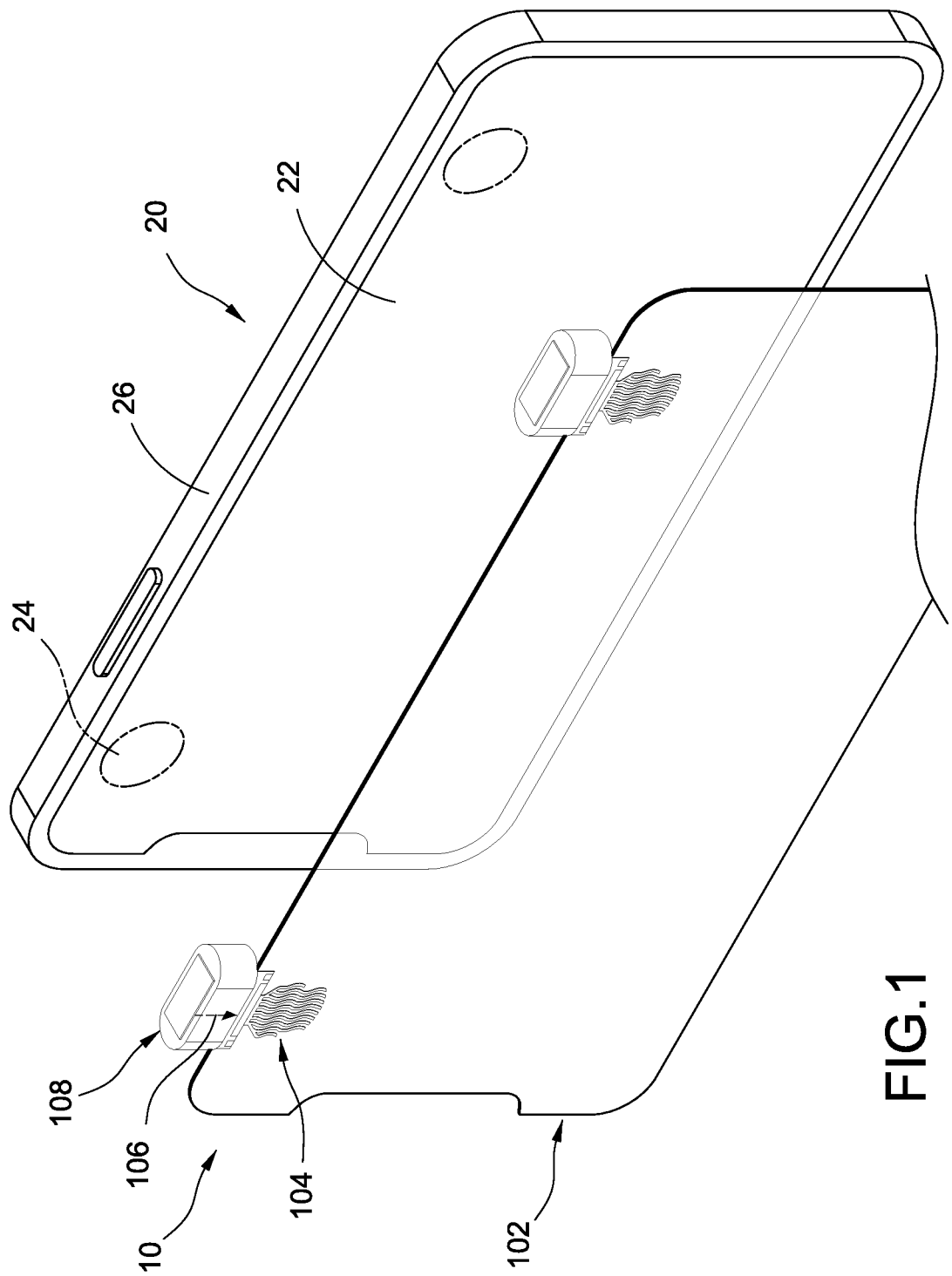
FIG. 1 shows a schematic diagram of an embodiment of the touch screen protective film structure of the present disclosure which is not attached to the electronic apparatus.
Figure 2:
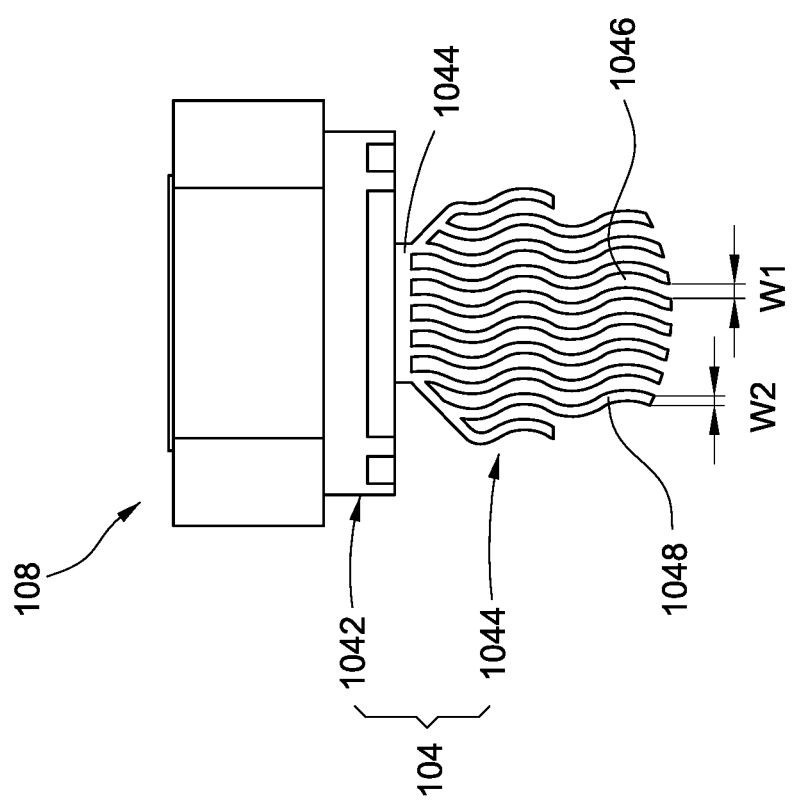
FIG. 2 shows a schematic diagram of an embodiment of the signal transmission path and the pressing mechanism of the present disclosure.
Figure 3:
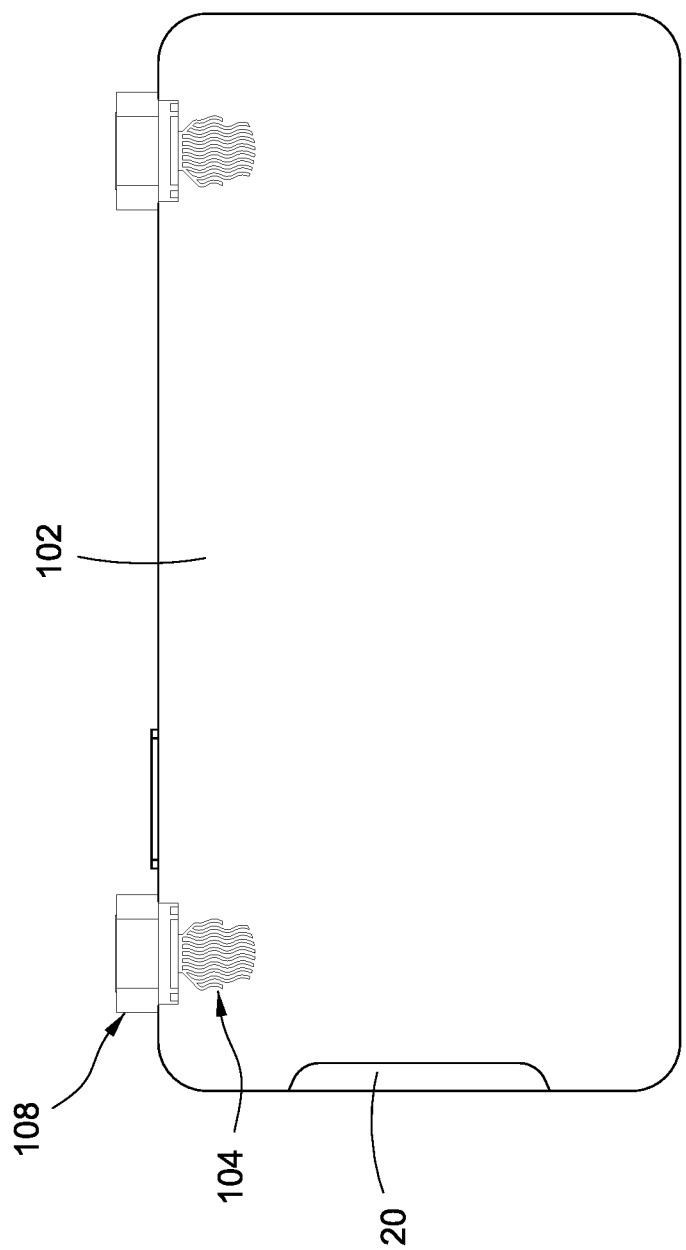
FIG. 3 shows a schematic diagram of an embodiment of the touch screen protective film structure of the present disclosure which is attached to the electronic apparatus.
Figure 4:
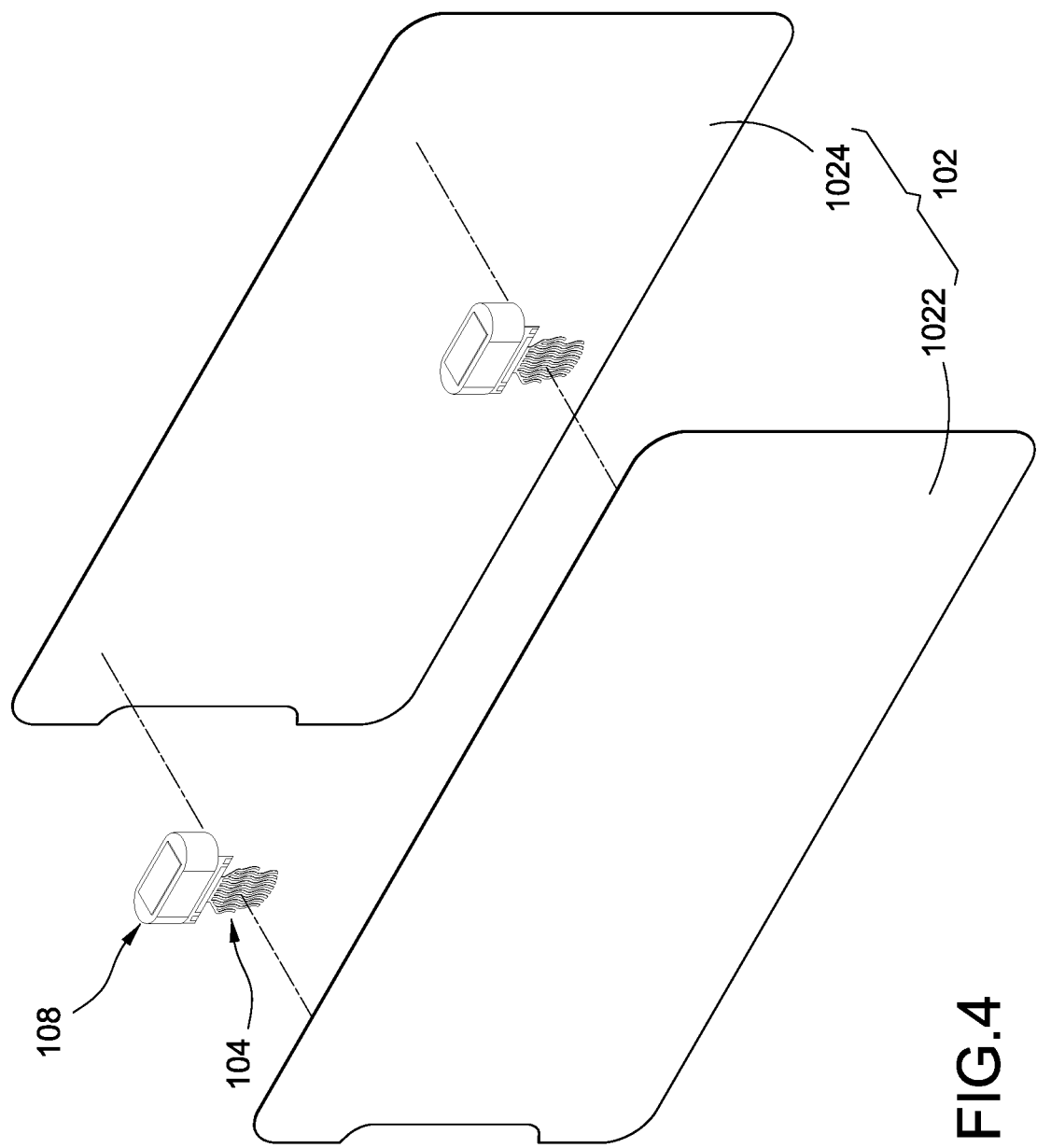
FIG. 4 shows an exploded view of an embodiment of the touch screen protective film of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a schematic diagram of an embodiment of the touch screen protective film structure of the present disclosure which is not attached to the electronic apparatus. FIG. 2 shows a schematic diagram of an embodiment of the signal transmission path and the pressing mechanism of the present disclosure. FIG. 3 shows a schematic diagram of an embodiment of the touch screen protective film structure of the present disclosure which is attached to the electronic apparatus. FIG. 4 shows an exploded view of an embodiment of the touch screen protective film of the present disclosure. Please refer to FIG. 1, FIG. 2, FIG. 3 and FIG. 4 at the same time.

A touch screen protective film structure 10 with a penetrating-transmitting signal function of the present disclosure is applied to an electronic apparatus 20 (for example, a smart phone). The electronic apparatus 20 includes a touch screen 22. The touch screen protective film structure 10 includes a touch screen protective film 102, at least one signal transmission path 104 and a pressing mechanism 108. The at least one signal transmission path 104 is embedded in the touch screen protective film 102 partially or completely. The touch screen protective film 102 is attached to the touch screen 22. The pressing mechanism 108 is arranged on one side 26 of the electronic apparatus 20.

The at least one signal transmission path 104 includes a first end 1042 and a second end 1044. The first end 1042 is embedded in the touch screen protective film 102 partially or completely. The pressing mechanism 108 is connected to the first end 1042. The second end 1044 is embedded in the touch screen protective film 102. The second end 1044 is configured to face a specific touch area 24 of the touch screen 22.

The second end 1044 includes a plurality of signal transmission branches 1048. The second end 1044 is configured to define at least one gap 1046. Namely, the at least one gap 1046 is defined between the signal transmission branches 1048. A first width W1 of the at least one gap 1046 is, for example but not limited to, between 0.5 millimeter to 15 millimeters. A second width W2 of each of the signal transmission branches 1048 is, for example but not limited to, between 0.1 millimeter to 4 millimeters. Each of the signal transmission branches 1048 is waved, straight, rounded or any other shaped. The at least one gap 1046 is waved, straight, rounded or any other shaped correspondingly. Or, the second end 1044 and the at least one gap 1046 are configured to form a hollow circular together.

The touch screen protective film 102 includes a touch screen protective layer 1022 and an adhesive layer 1024. The adhesive layer 1024 is attached to the touch screen 22. The at least one signal transmission path 104 is embedded between the touch screen protective layer 1022 and the adhesive layer 1024 partially or completely. The touch screen protective layer 1022 is, for example but not limited to, made of a glass, a toughened glass, a polyethylene terephthalate (PET) film or a thermoplastic polyurethane (TPU) film.

The pressing mechanism 108 is configured to be pressed (for example, pressed by the user's finger) to generate a touch signal 106 and transmit the touch signal 106 to the first end 1042. Then, the first end 1042 is configured to receive the touch signal 106 and transmit the touch signal 106 to the second end 1044. The specific touch area 24 is configured to sense the touch signal 106 to operate the electronic apparatus 20 (for example, to execute games or applications) based on the touch signal 106. At this time, just like the user's finger touches the specific touch area 24. The touch signal 106 is, for example but not limited to, an electrostatic signal.

The above content is intended to explain the execution of games or applications. If it is to execute the general touch function, and if the second end 1044 is touched (for example, touched by the user's finger), the specific touch area 24 is configured to penetrate the at least one gap 1046 defined by the second end 1044 to be touched for operating the electronic apparatus 20 (for example, executing the general touch function).

Furthermore, the at least one signal transmission path 104 further includes at least one conductive element (not shown in the above-mentioned figures). The at least one conductive element may include, for example but not limited to, metals, magnets, flexible printed circuit boards (FPCBs), cables, conductive inks (or transparent conductive inks) and conductive plasmas.

The advantage of the present disclosure is to provide a humanized touch method for the touch screen 22 to operate the electronic apparatus 20 (for example, to execute games or applications) without affecting the general touch function of the specific touch area 24 mentioned above. The reason why the general touch function of the specific touch area 24 will not be affected by the cover of the second end 1044 is that the specific touch area 24 can penetrate the at least one gap 1046 defined by the second end 1044 to be touched.

Although the present disclosure has been described with reference to the preferred embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A touch screen protective film structure with a penetrating-transmitting signal function applied to an electronic apparatus, the electronic apparatus comprising a touch screen, the touch screen protective film structure comprising:
   a touch screen protective film attached to the touch screen; and
   at least one signal transmission path embedded in the touch screen protective film partially or completely,
   wherein the at least one signal transmission path comprises:
   a first end embedded in the touch screen protective film partially or completely; and
   a second end embedded in the touch screen protective film, the second end configured to face a specific touch area of the touch screen,
   wherein the first end is configured to receive a touch signal and transmit the touch signal to the second end; the specific touch area is configured to sense the touch signal to operate the electronic apparatus based on the touch signal;
   wherein the second end is configured to define at least one gap; if the second end is touched, the specific touch area is configured to penetrate the at least one gap defined by the second end to be touched for operating the electronic apparatus;
   wherein the touch screen protective film structure further comprises a pressing mechanism connected to the first end and arranged on one side of the electronic apparatus; the pressing mechanism is configured to be pressed to generate the touch signal and transmit the touch signal to the first end;
   wherein the second end comprises a plurality of signal transmission branches; the at least one gap is defined between the signal transmission branches.

2. The touch screen protective film structure of claim 1, wherein a first width of the at least one gap is between 0.5 millimeter to 15 millimeters; a second width of each of the signal transmission branches is between 0.1 millimeter to 4 millimeters.

3. The touch screen protective film structure of claim 1, wherein each of the signal transmission branches is waved, straight or rounded; the at least one gap is waved, straight or rounded correspondingly.

4. The touch screen protective film structure of claim 1, wherein the touch screen protective film comprises a touch screen protective layer and an adhesive layer; the adhesive layer is attached to the touch screen; the at least one signal transmission path is embedded between the touch screen protective layer and the adhesive layer partially or completely.

5. The touch screen protective film structure of claim 4, wherein the touch screen protective layer is made of a toughened glass, a polyethylene terephthalate film or a thermoplastic polyurethane film.

6. The touch screen protective film structure of claim 1, wherein the touch signal is an electrostatic signal.

7. The touch screen protective film structure of claim 1, wherein the second end and the at least one gap are configured to form a hollow circular together.

* * * * *